United States Patent
Wang et al.

(10) Patent No.: US 11,225,169 B2
(45) Date of Patent: Jan. 18, 2022

(54) MANAGEMENT SYSTEM WITH SUPERVISORY CONTROL FOR RECHARGEABLE ENERGY STORAGE DEVICE IN ELECTRIC VEHICLE

(71) Applicant: GM GLOBAL TECHNOLOGY OPERATIONS LLC, Detroit, MI (US)

(72) Inventors: Yue-Yun Wang, Troy, MI (US); Lei Hao, Troy, MI (US); Brian J. Koch, Berkley, MI (US); Jeffrey S. Piasecki, Rochester, MI (US); Garrett M. Seeman, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 176 days.

(21) Appl. No.: 16/675,725

(22) Filed: Nov. 6, 2019

(65) Prior Publication Data
US 2021/0129706 A1 May 6, 2021

(51) Int. Cl.
| | |
|---|---|
| *H02J 7/00* | (2006.01) |
| *B60L 58/22* | (2019.01) |
| *B60L 58/12* | (2019.01) |
| *B60R 16/023* | (2006.01) |
| *B60L 50/64* | (2019.01) |

(52) U.S. Cl.
CPC ............. *B60L 58/22* (2019.02); *B60L 50/64* (2019.02); *B60L 58/12* (2019.02); *B60R 16/0231* (2013.01); *H02J 7/0014* (2013.01); *H02J 7/0021* (2013.01); *B60L 2240/547* (2013.01); *B60Y 2200/91* (2013.01); *Y02T 90/16* (2013.01)

(58) Field of Classification Search
CPC .......... B60L 58/22; B60L 58/12; B60L 50/64; B60L 2240/547; H02J 7/0021; H02J 7/0014; B60R 16/0231; Y02T 90/16; B60Y 2200/91
USPC .................................................. 320/109, 112
See application file for complete search history.

(56) References Cited

U.S. PATENT DOCUMENTS

| | | | |
|---|---|---|---|
| 6,184,656 B1 * | 2/2001 | Karunasiri | B60L 58/27 320/119 |
| 2012/0112685 A1 * | 5/2012 | Hartley | B60L 58/22 320/106 |
| 2015/0028816 A1 * | 1/2015 | Lee | H02J 7/0021 320/134 |

(Continued)

*Primary Examiner* — Zixuan Zhou
(74) *Attorney, Agent, or Firm* — Quinn IP Law

(57) ABSTRACT

Management system for a rechargeable energy storage device in an electric vehicle and corresponding method is disclosed. The rechargeable energy storage device has one or more battery packs each having a plurality of modules with one or more respective cells. A respective module management unit is embedded in each of the plurality of modules through respective microcircuits and configured to determine one or more local parameters. A supervisory controller is configured for two-way communication with the respective module management unit. The supervisory controller is configured to receive the local parameters, determine one or more global pack parameters based in part on the local parameters and transmit the global pack parameters back to the respective management unit. The supervisory controller is configured to control operation of the rechargeable energy storage device based in part on the global pack parameters and the local parameters.

19 Claims, 3 Drawing Sheets

(56) References Cited

U.S. PATENT DOCUMENTS

2015/0329003 A1* 11/2015 Li ........................... B60L 53/66
                                                            320/134
2017/0125784 A1*  5/2017 Dulle ................ H01M 10/4207

* cited by examiner

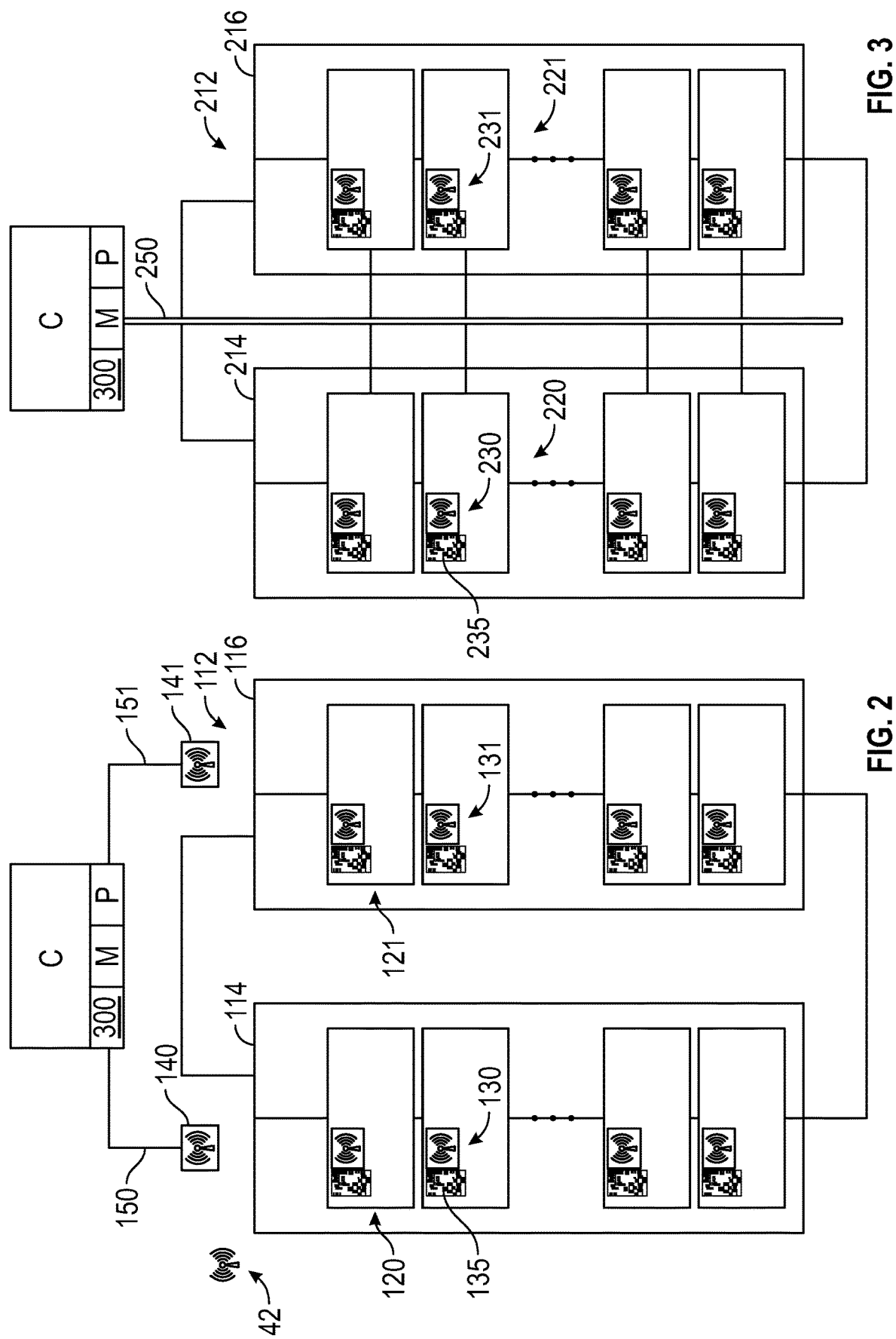

MANAGEMENT SYSTEM WITH SUPERVISORY CONTROL FOR RECHARGEABLE ENERGY STORAGE DEVICE IN ELECTRIC VEHICLE

INTRODUCTION

The present disclosure relates to a management system for a rechargeable energy storage device in an electric vehicle and method of controlling the rechargeable energy storage device. The use of mobile platforms employing a rechargeable energy source, both as an exclusive source of energy and a non-exclusive source of energy, has greatly increased over the last few years. A rechargeable energy storage device with battery packs may store and release electrochemical energy as needed during a given operating mode. The electrochemical energy may be employed for propulsion, heating or cooling a cabin compartment, powering vehicle accessories and other uses. The various cells in the battery packs may be characterized by different power, state of charge and capacity rates.

SUMMARY

Disclosed herein is a management system for a rechargeable energy storage device in an electric vehicle and method of controlling the rechargeable energy storage device. The rechargeable energy storage device has one or more battery packs. The battery packs each have a plurality of modules with one or more respective cells. Respective module management units are embedded through respective microcircuits in each of the plurality of modules. The respective module management units are configured to determine one or more local parameters, which may pertain to the module as a whole or to the respective cells individually in the module.

The management system is characterized by a distributed architecture and functional partition between the respective module management units and the supervisory controller. The supervisory controller is configured to receive the one or more local parameters, determine one or more global pack parameters based in part on the one or more local parameters and transmit the one or more global pack parameters back to the respective management unit. The respective module management unit monitors and manages individual cell operations based on the received global pack parameters to deliver the desired pack performance and maximize battery life. The supervisory controller is configured to control operation of the rechargeable energy storage device based in part on the one or more global pack parameters and one or more local parameters.

In one example, a pack communicator is configured to interface wirelessly with the respective module management unit, the pack communicator being connected to the supervisory controller via at least one communication BUS. The battery packs may include a first battery pack and a second battery pack. In another example, a shared communication BUS is configured to enable direct communication between the supervisory controller, the respective module management units in the first battery pack and the respective module management units in the second battery pack.

The management system may include at least two pack sensors. The pack sensors may be configured to respectively measure and transmit a pack voltage and current of the battery pack to the supervisory controller. The pack sensors may be configured to determine respective temperatures of the battery packs. The plurality of modules may be configured to include multiple sensor arrays to measure the individual cell's voltage and to determine a respective module voltage based on the measurements from the multiple sensor arrays. When a difference between the sum of respective module voltages and the pack voltage is above a predetermined threshold, the supervisory controller may be configured to determine whether an irregularity exists in at least one of the respective module voltage and the pack voltage based in part on a fault detection module selectively executable by the supervisory controller.

When the difference between the sum of respective module voltages and the pack voltage is above the predetermined threshold and the irregularity is in the pack voltage, the supervisory controller is configured to reset a value of the pack voltage as the sum of respective module voltage. When the difference between the sum of respective module voltages and the pack voltage is above the predetermined threshold and the irregularity is in the respective module voltage, the supervisory controller is configured to transmit an alert and/or derate a power rating of the battery packs.

The local parameters may include a respective cell state of charge, a respective cell state of health when at least one of the respective cells meets a predefined weak cell threshold, a module state of charge, a module capacity, an allowable module voltage limit, an allowable module current limit and an allowable module temperature limit. The global pack parameters may include a power estimation for the one or more battery packs and a cell balancing target. The global pack parameters may include a pack state of charge, a pack capacity and a weak cell state of health monitoring function, which may project how much energy remains in the at least one battery pack, and/or how far the electric vehicle may still travel.

In one example, the respective module management unit determines a respective current limit ($I_{mi}$), with i being a module index. The supervisory controller obtains an allowable pack current limit ($I_{pL}$) as a minimum of the respective current limits [$I_{pL}$=($I_{m1}$, $I_{m2}$, ... $I_{mn}$)], with n being a quantity of the plurality of modules in each of the one or more battery packs. The supervisory controller is configured to determine a total power ($P_{wp}$) at one or more time horizons (such as at 0.1, 2 and 10 seconds) of the at least one battery pack as a summation of respective module powers ($P_{mi}$) such that [$P_{wp}$=$P_{m1}$+$P_{m2}$+ ... +$P_{mn}$], the respective module powers ($P_{mi}$) being determined based on the received pack current limit.

In another example, the respective module management unit determines a respective maximum module state of charge (SOC($M_i$)_max=max(SOC($C_j$), j=1, 2 ... k), with i being a module index and k being a quantity of the respective cells. The respective module management unit determines a respective module minimum state of charge (SOC($M_i$)_min=min(SOC($C_j$)), j=1, 2 ... k). The global pack parameters may include a pack maximum state of charge (SOC$_{max}$=max (SOC($M_i$)_max), i=1, 2 ... n), n being a quantity of the plurality of modules), a pack minimum state of charge (SOC$_{min}$=min (SOC($M_i$)_min), i=1, 2 ... n) and a targeted pack state of charge for the at least one battery pack. The targeted pack state of charge is determined as: SOC$_{target}$=½(SOC$_{max}$-SOC$_{min}$) and is sent back to the respective module management unit. The respective module management units may be configured to execute cell balancing (for the respective cells in its own module) based on the targeted pack state of charge (SOC$_{target}$).

In another example, the plurality of modules includes at least four modules. The local parameters may include a respective module state of charge. The global pack parameters may include a real-time pack state of charge defined as the minimum module state of charge among the plurality of modules, or as a moving average of three lowest values of the respective module state of charge, when the three lowest values are within a predetermined range, i.e. none of them is largely deviated from the rest. The local parameters may include a respective module capacity. The global pack parameters may include a pack capacity defined as the minimum module capacity among the plurality of modules, or as a mean of three lowest values of the respective module capacity, when the three lowest values are within a predetermined range, i.e. none of them is largely deviated from the rest.

The above features and advantages and other features and advantages of the present disclosure are readily apparent from the following detailed description of the best modes for carrying out the disclosure when taken in connection with the accompanying drawings.

BRIEF DESCRIPTION OF THE DRAWINGS

FIG. 2 is a schematic fragmentary illustration of an alternate configuration for the rechargeable energy storage device of FIG. 1;

FIG. 3 is a schematic fragmentary illustration of another alternate configuration for the rechargeable energy storage device of FIG. 1.

DETAILED DESCRIPTION

Figure 1:
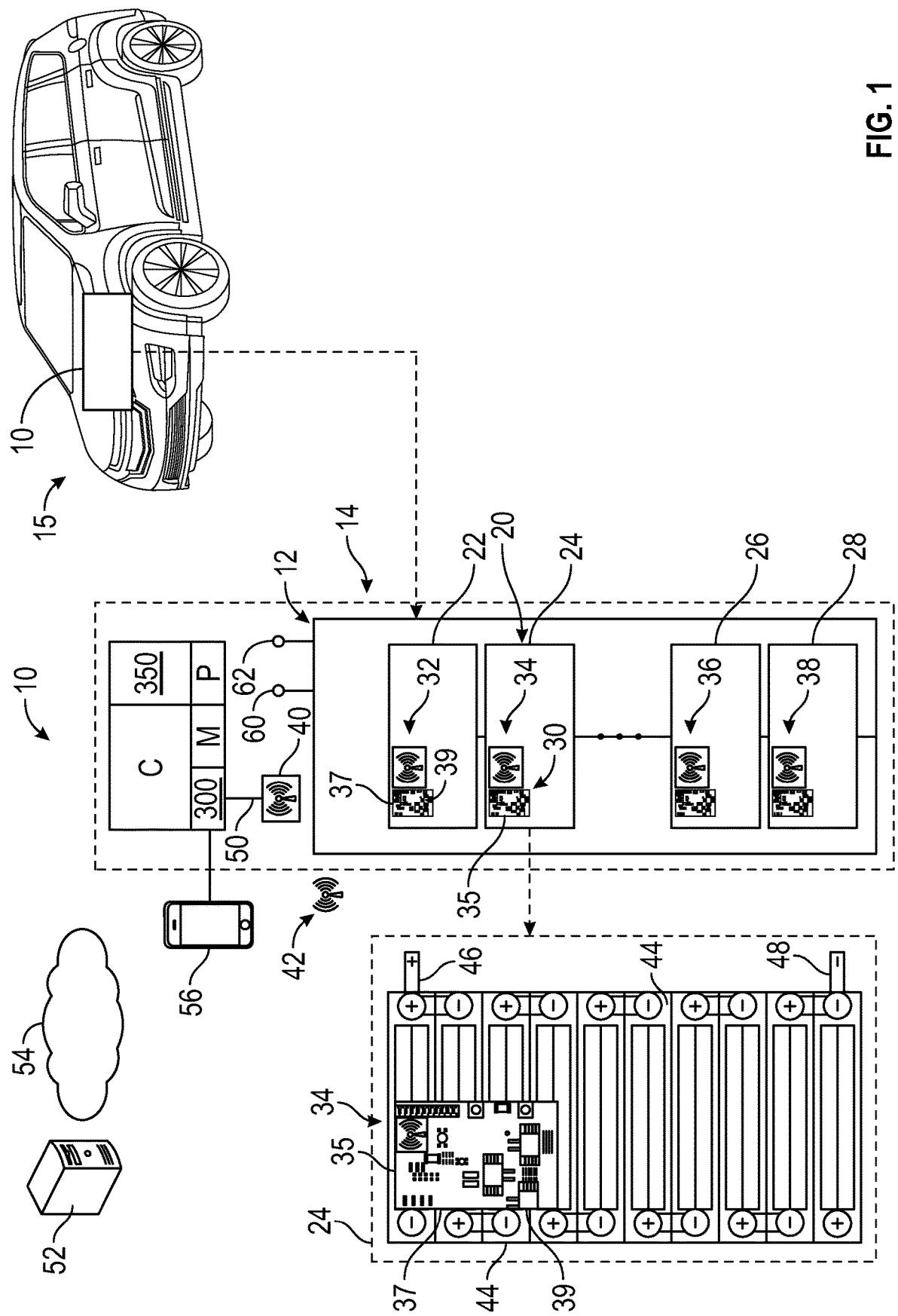
FIG. 1 is a schematic illustration of a management system having a rechargeable energy storage device and a supervisory controller.

Referring to the drawings, wherein like reference numbers refer to like components, FIG. 1 schematically illustrates a management system 10 for managing a rechargeable energy storage device 12 in an electric vehicle 15, which may be partially electric or fully electric. The electric vehicle 15 may be a mobile platform, such as, but not limited to, a passenger vehicle, sport utility vehicle, light truck, heavy duty vehicle, ATV, minivan, bus, transit vehicle, bicycle, moving robot, farm implement (e.g. tractor), sports-related equipment (e.g. golf cart), boat, plane and train. It is to be understood that the electric vehicle 15 may take many different forms and have additional components.

Referring to FIG. 1, the rechargeable energy storage device 12 includes one or more battery packs ("one or more" omitted henceforth) such as battery pack 14, each having a plurality of modules 20. Referring to FIG. 1, the battery pack 14 includes a first, second, third and fourth modules 22, 24, 26, 28. Referring to FIG. 1, each of the plurality of modules 20 includes one or more respective cells 44 connected for current flow between a first terminal 46 and a second terminal 48. The respective cells 44 may include battery cells having different chemistries, including but not limited to, lithium-ion, lithium-iron, nickel metal hydride and lead acid batteries. The number of cells per module and the number of modules per battery pack may be varied based on the application at hand.

Referring to FIG. 1, a respective module management unit 30 is embedded in each of the plurality of modules 20. The respective module management unit 30 is configured to measure one or more local parameters, which may pertain to the module as a whole or the respective cells 44 in the module. The local parameters may include voltages from each of its respective cells 44, module current and module temperature. Referring to FIG. 1, the first, second, third and fourth modules 22, 24, 26, 28 respectively incorporate first, second, third and fourth module management units 32, 34, 36, and 38. Referring to FIG. 1, each of the respective module management units 30 is embedded in the plurality of modules 20 through respective microcircuits 35. The respective microcircuits 35 are an assembly of electronic components, with a core embodied by a microcontroller and including a wireless/CAN communication interface. It is to be understood that the respective microcircuits 35 may be fabricated as a single unit/chip or as multiple combined units/chips. The respective microcircuits 35 include an associated memory 37 and an associated processor 39. The respective module management unit 30 may include an integrated electronic controls unit, such as an application-specific integrated circuit (ASIC).

Referring to FIG. 1, a pack communicator 40 may be configured to interface wirelessly with the respective module management unit 30, via a wireless network 42, which may be a short-range network or a long-range network. The wireless network 42 may be a Wireless Local Area Network (LAN) which links multiple devices using a wireless distribution method, a Wireless Metropolitan Area Networks (MAN) which connects several wireless LANs or a Wireless Wide Area Network (WAN) which covers large areas such as neighboring towns and cities. The wireless network 42 may be WIFI or a Bluetooth™ connection, defined as being a short-range radio technology (or wireless technology) aimed at simplifying communications among Internet devices and between devices and the Internet. Bluetooth™ is an open wireless technology standard for transmitting fixed and mobile electronic device data over short distances and creates personal networks operating within the 2.4 GHz band. Other types of connections may be employed.

Referring to FIG. 1, the management system 10 includes a supervisory controller C configured for two-way communication with the respective management units 30. The supervisory controller C may be an integral portion of, or a separate module operatively connected to, other controllers of the electric vehicle 15. In one example, the supervisory controller C is embedded as a layer in a vehicle integration control module (VICM) of a motor vehicle. Referring to FIG. 1, the pack communicator 40 is linked or connected to the supervisory controller C via at least one communication BUS 50, which may be a serial communication BUS in the form of a local area network. The local area network may include, but is not limited to, a Controller Area Network (CAN), a Controller Area Network with Flexible Data Rate (CAN-FD).

Referring to FIG. 1, the supervisory controller C includes at least one processor P and at least one memory M (or non-transitory, tangible computer readable storage medium) on which instructions are recorded for executing a method 300, described below with respect to FIG. 4. The memory M can store executable instruction sets, and the processor P can execute the instruction sets stored in the memory M.

The management system 10 is characterized by a functional partition between the respective management units 30 and the supervisory controller C. In other words, the respective management units 30 and the supervisory controller C may perform mutually exclusive functions. The respective management unit 30 is configured to receive the pack current from the supervisory controller C, and to measure and monitor respective voltages from each of its respective cells 44, as well as the temperature of the module and respective cells 44. The respective management unit 30 may determine one or more local parameters, which may include a respective maximum and minimum module voltages, module state of charge, module capacity, cell state of charge, a respective cell state of health if a weaker cell is detected, an allowable module voltage limit and an allowable module current limit. The supervisory controller C is configured to receive the one or more local parameters, determine one or more global pack parameters based in part on the one or more local parameters and transmit the one or more global pack parameters back to the respective management units 30.

The supervisory controller C is configured to control operation of the rechargeable energy storage device 12 based in part on the one or more global pack parameters. The global pack parameters may include a respective power estimation for the battery pack 14, a cell balancing target, a pack state of charge, a pack capacity and a weak cell state of health monitoring function. The supervisory controller C may flag a weak cell (based on data provided by the respective management unit 30) and follow up or track its state of health via the weak cell state of health monitoring function. The acceptable threshold for defining a "weak" cell may be varied based on the application at hand and may include a predefined minimum capacity. The supervisory controller C may control battery charging current and voltage and time based on one or more global parameters, such as pack voltage, temperature and current limits, and state of health of a weaker cell. Additionally, the global pack parameters may be consumed as data by other controllers in the electric vehicle 15. Referring to FIG. 1, the system 10 includes at least two pack sensors 60, 62. The pack sensors are configured to detect and transmit a pack voltage, a pack current and/or temperature of the battery pack 14 to the supervisory controller C.

The respective module management unit 30 may be configured to store local parameters, e.g. module manufacture series numbers, module chemistry profile, module state of charge, module capacity, and module and/or associated cell state of health parameters, in their respective microcontroller memory 37. Thus, in the event one of the plurality of modules 20 requires servicing, a diagnostic scan tool or module repair tool may work directly with the respective module management unit 30 for service based on these parameters. A refurbished module may be updated with these parameters through the respective module management unit 30 during a module rebuilt, such that when it is reassembled back into the battery pack 14, it is immediately ready to work with the supervisory controller C without further testing and/or calibration.

Alternate configurations for the rechargeable energy storage device 12 are shown in FIGS. 2 and 3. Referring to FIG. 2, the rechargeable energy storage device 112 includes a first battery pack 114 having a first plurality of modules 120 and a second battery pack 116 having a second plurality of modules 121. Each of the first plurality of modules 120 includes a respective module management unit 130 (embedded through respective microcircuits 135) and configured to measure its local parameters. Referring to FIG. 2, a first pack communicator 140 is configured to interface wirelessly with the respective module management unit 130, via the wireless network 42. Similarly, each of the second plurality of modules 121 includes a respective module management unit 131 configured to measure its local parameters. A second pack communicator 141 is configured to interface wirelessly with the respective module management unit 131, via the wireless network 42. The first pack communicator 140 and the second pack communicator 141 are linked or connected with a supervisory controller C via a first communication BUS 150 and a second communication BUS 151. The first battery pack 114 and the second battery pack 116 may be connected in parallel or in series.

Referring to FIG. 3, the rechargeable energy storage device 212 includes a first battery pack 214 having a first plurality of modules 220 and a second battery pack 216 having a second plurality of modules 221. Each of the first plurality of modules 220 includes a respective module management unit 230 (embedded through respective microcircuits 235) configured to measure its local parameters. Similarly, each of the second plurality of modules 221 includes a respective module management unit 231 configured to measure its local parameters. A supervisory controller C is linked or connected to each of the first plurality of modules 220 and the second plurality of modules 221 through a shared communication BUS 250.

Referring to FIG. 1, the supervisory controller C may be configured to communicate with a remote server 52 and/or a cloud unit 54, via the wireless network 42. The remote server 50 may be a private or public source of information maintained by an organization, such as for example, a research institute or a company. The cloud unit 54 may include one or more servers hosted on the Internet to store, manage, and process data. The supervisory controller C may be configured to receive and transmit wireless communication to the remote server 50 through a mobile application 56, shown in FIG. 1. The mobile application 56 may be in communication with the supervisory controller C such that it has access to the data in the supervisory controller C. In one example, the mobile application 56 is physically connected (e.g. wired) to the supervisory controller C. In another example, the mobile application 56 is embedded in the supervisory controller C. The circuitry and components of a mobile application 56 ("apps") available to those skilled in the art may be employed.

In one example, each of the plurality of modules 20 obtains its respective current limits ($I_{mi}$), which may be estimated from the current limits of its respective cells 44, and sends it to the supervisory controller C, which determines an allowable pack current limit ($I_{pL}$) as a minimum of the respective current limits [$I_{pL}$=min($I_{m1}$, $I_{m2}$, ... $I_{mn}$)]. This data is sent back to the plurality of modules 20 and the respective current limits ($I_{mi}$) are replaced by the allowable pack current limit ($I_{pL}$). In other words, the allowable pack current limit ($I_{pL}$) is imposed as a new limit for each of the plurality of modules 20, regardless of the respective current limits ($I_{mi}$).

In another example, the respective module management units 30 determine a respective maximum module state of charge(SOC($M_i$)_max=max(SOC($C_j$), j=1, 2 ... k) as a maximum state of charge of the respective cells 44, with i being a module index and k being a quantity of the respective cells. The respective module management unit determines a respective module minimum state of charge (SOC($M_i$)_min=min(SOC(C)), j=1, 2 ... k), as a minimum state of charge of the respective cells 44. The global pack parameters may include a pack maximum state of charge ($SOC_{max}$=max (SOC($M_i$)_max)), a pack minimum state of charge ($SOC_{min}$=min (SOC($M_i$)_min)), and a targeted pack state of charge for the battery pack 14. The targeted pack state of charge is determined as: $SOC_{target}$=½($SOC_{max}$−$SOC_{min}$) and is sent back to the respective module management units 30. The respective module management units 30 may be configured to execute cell balancing (for the respective cells in its own module) based on the targeted pack state of charge ($SOC_{target}$).

In another example, the respective plurality of modules 20 includes at least four modules. The local parameters may include a respective module state of charge ($SOC_{Mi}$) and the global pack parameters may include a real-time pack state of charge defined as the minimum module state of charge among the plurality of modules, or as a moving average of the three lowest values of the respective module state of charge when the three lowest values are within a predetermined range, i.e. none of them is largely deviated from the rest. The local parameters may include a respective module capacity and the global pack parameters may include a pack capacity defined as the minimum module capacity among the plurality of modules, or as a mean of three lowest values of the respective module capacity when the three lowest values are within a predetermined range.

Figure 4:
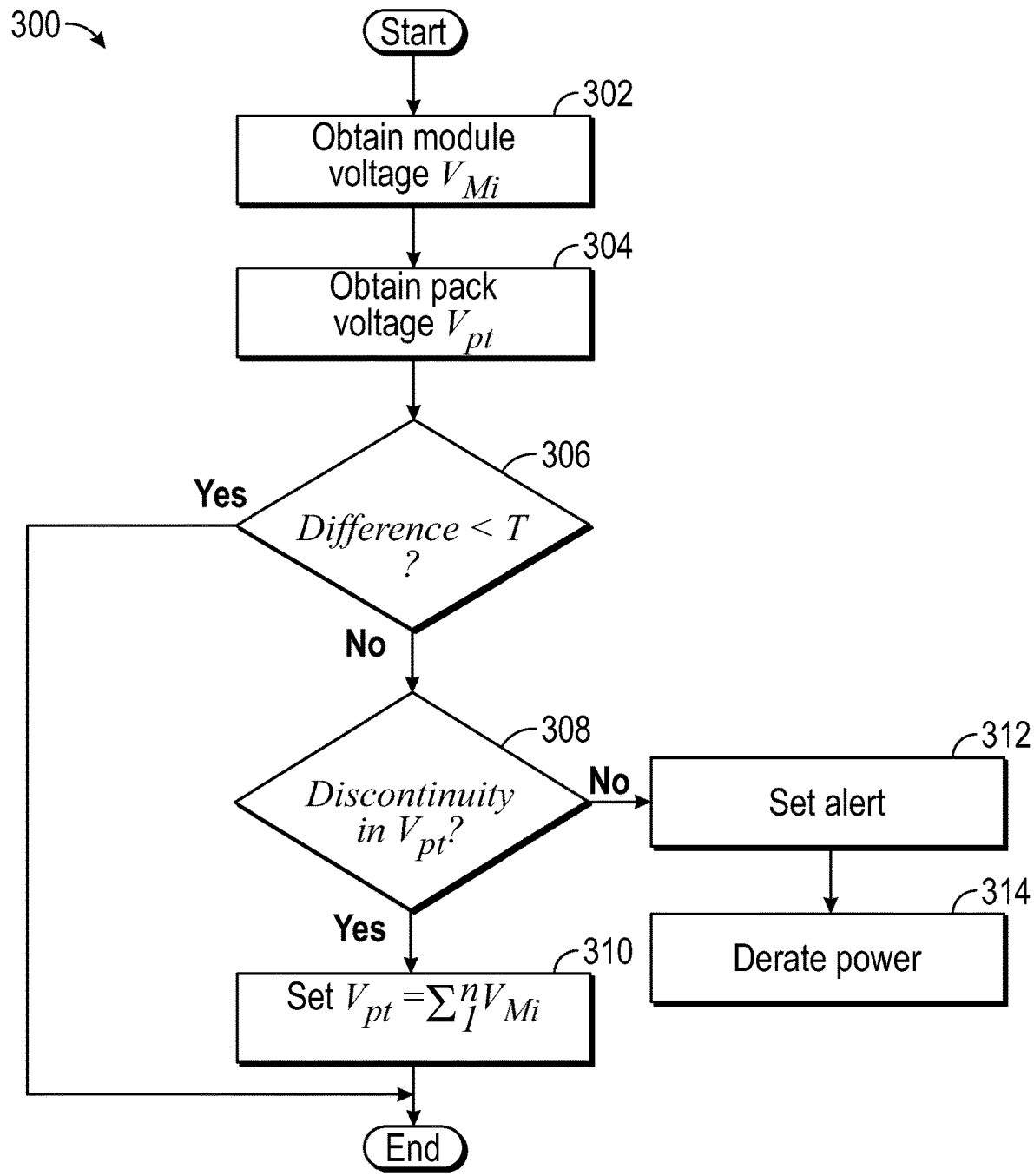
FIG. 4 is a schematic flow diagram of a method executable by the supervisory controller and/or mobile application of FIG. 1.

Referring now to FIG. 4, a flowchart of the method 300 is shown. Method 300 may be stored on and executable by at least one of the supervisory controller C and the mobile application 56 of FIG. 1. The method 300 need not be applied in the specific order recited herein and may be dynamically executed. Furthermore, it is to be understood that some steps may be eliminated. As used herein, the terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine.

Per block 302 of FIG. 4, the respective module management unit 30 is configured to obtain its respective module voltage ($V_{mi}$) from the respective cell voltages ($V_{ci}$), such that $V_{mi}=V_{C1}+V_{C2}\ldots+V_{Ck}$, where k indicates the number of cells within a module, and i=1, 2 . . . n indicates the quantity of modules in the battery pack 14. The plurality of modules 20 may include multiple sensor arrays configured to measure the respective cell voltages of the respective cells 44. Sensor arrays available to those skilled in the art may be employed. Referring to FIG. 1, as noted above, the management system 10 may include at least two pack sensors 60, 62 configured to generate pack sensor data with respect to the battery pack 14. Per block 304 of FIG. 4, the supervisory controller C is configured to receive a pack voltage ($V_{pt}$) of the battery packs via one of the at least two pack sensors 60, 62. Per block 306, the supervisory controller C is configured to determine if a difference between the sum of the respective module voltages and the pack voltage is less than a predetermined threshold (T). If so, the method 300 is ended.

When the difference between the sum of the respective module voltages and the pack voltage is above the predetermined threshold, the method 300 proceeds to block 308. Referring to FIG. 1, the management system 10 may include a fault detection module 350 selectively executable by the supervisory controller C. Per block 308, the supervisory controller C is configured to determine whether an irregularity exists in the pack voltage, via the fault detection module 350. The fault detection module 350 is configured to receive the pack sensor data, analyze the pack sensor data and compare it to a fault algorithm or look up table to determine whether faulty data is generated. The fault detection module 350 may include a physical model, a heuristics model, a reinforcement learning and/or machine-learning model. The fault detection module 350 may be designed or numerically trained to respond to a set of faults by a respective process.

When an irregularity is in the pack voltage, the method 300 proceeds to block 310, where the supervisory controller C is configured to reset a value of the pack voltage as the sum of the respective module voltages. When the irregularity is not in the pack voltage, the method 300 proceeds to blocks 312 and 314. Per block 312, the supervisory controller C is configured to transmit an alert, for example, to a user of the electric vehicle 15 via a user interface. The supervisory controller C may be configured to transmit an alert to the remote server 52 via the wireless network 42 and/or the mobile application 56. For example, this information may be employed by a fleet supervisor when the electric vehicle 15 is an autonomous vehicle.

Per block 314, the supervisory controller C is configured to derate or reduce a power rating of the battery pack 14. If the total power rating of the rechargeable storage device 12 is sufficiently reduced (i.e. reaches a predefined minimum), the supervisory controller C may be configured to switch to an alternative mode of operation, which may be a limp-home mode or other mode restricting energy consumption and/or speed of the electric vehicle 15.

In summary, the management system 10 provides for focused individual cell monitoring as well as allowing cross-checking for the at least two pack sensors 60, 62. Additionally, the management system 10 allows for a wireless management strategy and reconfigurable system. In other words, removal and replacement of one module does not affect other modules. Accordingly, the management system 10 improves the functioning of the electric vehicle 15.

The flowchart in FIG. 3 illustrate an architecture, functionality, and operation of possible implementations of management systems, methods, and computer program products according to various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by specific purpose hardware-based management systems that perform the specified functions or acts, or combinations of specific purpose hardware and computer instructions. These computer program instructions may also be stored in a computer-readable medium that can direct a supervisory controller or other programmable data processing apparatus to function in a particular manner, such that the instructions stored in the computer-readable medium produce an article of manufacture including instructions to implement the function/act specified in the flowchart and/or block diagram blocks.

The supervisory controller C includes a computer-readable medium (also referred to as a processor-readable medium), including a non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which may constitute a main memory. Such instructions may be transmitted by one or more transmission media, including coaxial cables, copper wire and fiber optics, including the wires that comprise a management system bus coupled to a processor of a computer. Some forms of computer-readable media include, for example, a floppy disk, a flexible disk, hard disk, magnetic tape, other magnetic media, a CD-ROM, DVD, other optical media, punch cards, paper tape, other physical media with patterns of holes, a RAM, a PROM, an EPROM, a FLASH-EE-PROM, other memory chips or cartridges, or other media from which a computer can read.

Look-up tables, databases, data repositories or other data stores described herein may include various kinds of mechanisms for storing, accessing, and retrieving various kinds of data, including a hierarchical database, a set of files in a file management system, an application database in a proprietary format, a relational database management system (RDBMS), etc. Each such data store may be included within a computing device employing a computer operating management system such as one of those mentioned above and may be accessed via a network in one or more of a variety of manners. A file management system may be accessible from a computer operating management system and may include files stored in various formats. An RDBMS may employ the Structured Query Language (SQL) in addition to a language for creating, storing, editing, and executing stored procedures, such as the PL/SQL language mentioned above.

The detailed description and the drawings or FIGS. are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. A management system for an electric vehicle, the management system comprising:
   a rechargeable energy storage device having one or more battery packs, the one or more battery packs respectively having a plurality of modules with one or more respective cells;
   respective module management units embedded in each of the plurality of modules through respective microcircuits, the respective module management units being configured to determine one or more local parameters;
   a supervisory controller configured to engage in two-way communications with the respective module management units;
   wherein the supervisory controller is configured to receive the one or more local parameters, determine one or more global pack parameters based in part on the one or more local parameters and transmit the one or more global pack parameters to the respective module management units; and
   wherein the supervisory controller is configured to control operation of the rechargeable energy storage device based in part on the one or more global pack parameters.

2. The management system of claim 1, further comprising:
   a pack communicator configured to interface wirelessly with the respective module management units for respective data transmission; and
   wherein the pack communicator is directly connected to the supervisory controller via at least one communication BUS.

3. The management system of claim 1, wherein the one or more battery packs include a first battery pack and a second battery pack and further comprising:
   a first pack communicator configured to interface wirelessly with the respective module management units in the first battery pack, the first pack communicator being connected to the supervisory controller via a first communication BUS; and
   a second pack communicator configured to interface wirelessly with the respective module management units in the second battery pack, the second pack communicator being connected to the supervisory controller via a second communication BUS.

4. The management system of claim 1, wherein the one or more battery packs include a first battery pack and a second battery pack and further comprising:
   a shared communication BUS configured to enable direct communication between the supervisory controller, the respective module management units in the first battery pack and the respective module management units in the second battery pack.

5. The management system of claim 1, further comprising:
   at least two pack sensors configured to respectively measure and transmit a pack voltage and a pack current of the one or more battery packs to the supervisory controller;
   a fault detection module selectively executable by the supervisory controller;
   wherein the respective module management units are configured to determine respective module voltages and communicate the respective module voltages to the supervisory controller, the supervisory controller being configured to calculate a sum of the respective module voltages; and
   wherein the supervisory controller is configured to, when a difference between the sum of the respective module voltages and the pack voltage is above a predetermined threshold, determine whether an irregularity exists in the pack voltage via the fault detection module.

6. The management system of claim 5, wherein:
   the supervisory controller is configured to, when the difference between the sum of the respective module voltages and the pack voltage is above the predetermined threshold and the irregularity is in the pack voltage, reset a value of the pack voltage as the sum of the respective module voltages.

7. The management system of claim 6, wherein:
   when the difference between the sum of the respective module voltages and the pack voltage is above the predetermined threshold and the irregularity is not in the pack voltage, the supervisory controller is configured to at least one of transmit an alert and derate a respective power rating of the one or more battery packs.

8. The management system of claim 1, wherein:
   the one or more local parameters include an array of cell voltages, a respective cell state of charge, a respective cell state of health, an allowable module voltage limit, an allowable module temperature limit and an allowable module current limit; and the one or more global pack parameters include a power estimation for the one or more battery packs and a cell balancing target.

9. The management system of claim 1, wherein:

the one or more local parameters include a respective cell state of charge, a respective cell state of health when at least one of the respective cells meets a predefined weak cell threshold, an allowable module voltage limit and an allowable module current limit;

the one or more global pack parameters include a pack state of charge, a pack capacity and a weak cell state of health monitoring function; and the weak cell state of health monitoring function is configured to estimate an amount of energy remaining in the at least one battery pack.

10. The management system of claim 1, wherein:

the one or more local parameters include respective current limits ($I_{mi}$) for the plurality of modules, i being a module index and n being a quantity of the plurality of modules in each of the one or more battery packs;

the one or more global pack parameters include an allowable pack current limit ($I_{pL}$) determined as a minimum of respective current limits [$I_{pL}$=min ($I_{m1}$, $I_{m2}$, ... $I_{mn}$)]; and the supervisory controller is configured to determine or predict a total power ($P_{wp}$) at one or more time horizons for the one or more battery packs as a summation of respective module powers ($P_{mi}$) such that [$P_{wp}$=$P_{m1}$+ $P_{m2}$+ ... $P_{mn}$], the respective module powers ($P_{mi}$) being determined by the respective module management units based on the pack current limit.

11. The management system of claim 1, wherein:

the one or more local parameters include a respective module maximum state of charge (SOC($M_i$)_max=max (SOC($C_j$), j=1,2 ... k), with i being a module index and k being a quantity of the respective cells;

the one or more local parameters include a respective module minimum state of charge (SOC($M_i$)_min=min (SOC($C_j$)), j=1,2 ... k);

the one or more global pack parameters include a pack maximum state of charge (SOC$_{max}$=max (SOC($M_i$)_max),),i=1,2 ... n), n being a quantity of the respective modules, a pack minimum state of charge (SOC$_{min}$=min (SOC($M_i$)_min), i=1,2 ... n), and a targeted pack state of charge for the at least one battery pack; and the targeted pack state of charge (SOC$_{target}$) is determined as:

$$SOC_{target}=\tfrac{1}{2}(SOC_{max}-SOC_{min}).$$

12. The management system of claim 1, wherein:

the plurality of modules includes at least four modules;

the one or more local parameters include a module state of charge; and the one or more global pack parameters include a real-time pack state of charge;

the real-time pack state of charge is defined as at least one of a minimum module state of charge among the plurality of modules and a moving average of three lowest values of the respective module state of charge, the three lowest values being within a predetermined range.

13. The management system of claim 1, wherein:

the plurality of modules includes at least four modules;

the one or more local parameters include a respective module capacity; and the one or more global pack parameters include a pack capacity defined as at least one of a minimum module capacity among the plurality of modules and a mean of three lowest values of the respective module capacity, the three lowest values being within a predetermined range.

14. A method of controlling a rechargeable energy storage device having one or more battery packs in an electric vehicle having a supervisory controller with a processor and tangible, non-transitory memory, the method comprising:

configuring the one or more battery packs with a plurality of modules each having one or more respective cells;

installing respective module management units in each of the plurality of modules through respective microcircuits, the supervisory controller being configured for two-way communication with the respective module management units;

determining one or more local parameters and transmitting the one or more local parameters to the supervisory controller, via the respective module management units;

receiving the one or more local parameters, determining one or more global pack parameters based in part on the one or more local parameters and transmitting the one or more global pack parameters to the respective module management units, via the supervisory controller; and configuring the supervisory controller to control operation of the rechargeable energy storage device based in part on the one or more global pack parameters.

15. The method of claim 14, wherein the one or more battery packs include a first battery pack and a second battery pack and further comprising:

connecting a first pack communicator to the supervisory controller via a first communication BUS and configuring the first pack communicator to interface wirelessly with the respective module management units in the first battery pack; and connecting a second pack communicator to the supervisory controller, via a second communication BUS, and configuring the second pack communicator to interface wirelessly with the respective module management units in the second battery pack.

16. The method of claim 14, wherein the one or more battery packs include a first battery pack and a second battery pack and further comprising:

facilitating direct communication between the supervisory controller, the respective module management units in the first battery pack and the respective module management units in the second battery pack via a shared communication BUS.

17. The method of claim 14, further comprising:

obtaining a pack voltage and a pack current of the one or more battery packs, via at least two pack sensors respectively;

determining respective module voltages based on voltages of the respective cells and communicating the respective module voltages to the supervisory controller, via the respective module management units;

calculating a sum of the respective module voltages, via the supervisory controller; and determining whether an irregularity exists in the pack voltage, via a fault detection module in the supervisory controller, when a difference between the sum of the respective module voltages and the pack voltage is above a predetermined threshold.

18. The method of claim 17, further comprising:
resetting a value of the pack voltage as the sum of the respective module voltages, when the difference between the sum of the respective module voltages and the pack voltage is above the predetermined threshold and the irregularity is in the pack voltage;
at least one of transmitting an alert and derating a respective power rating of the one or more battery packs, via the supervisory controller, when the difference between the respective module voltage and the pack voltage is above the predetermined threshold and the irregularity is not in the pack voltage.

19. An electric vehicle comprising:
a rechargeable energy storage device having one or more battery packs, the one or more battery packs respectively having a plurality of modules with one or more respective cells;
respective module management units embedded in each of the plurality of modules through respective microcircuits, the respective module management units being configured to determine one or more local parameters;
a supervisory controller configured to engage in two-way communications with the respective module management units;
a respective pack communicator configured to interface wirelessly with the respective module management units, the respective pack communicator being connected to the supervisory controller via at least one communication BUS;
wherein the supervisory controller is configured to receive the one or more local parameters, determine one or more global pack parameters based in part on the one or more local parameters and transmit the one or more global pack parameters back to the respective module management units;
wherein the one or more local parameters include a module state of charge, a module capacity, a respective cell state of charge, a respective cell state of health, an allowable module voltage limit, an allowable module temperature limit and an allowable module current limit;
wherein the one or more global pack parameters include a power estimation for the one or more battery packs, a cell balancing target, a pack state of charge, a pack capacity and a weak cell state of health monitoring function; and
wherein the supervisory controller is configured to control operation of the rechargeable energy storage device based in part on the one or more global pack parameters.

* * * * *